Jan. 1, 1935. C. A. HULT 1,985,895
VELOCIPEDE
Filed Oct. 1, 1932 3 Sheets-Sheet 1
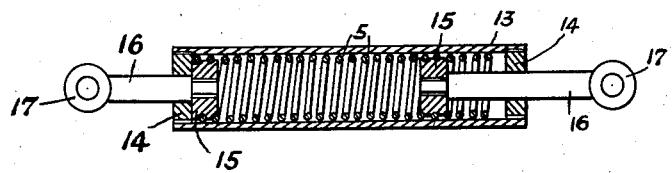
Fig.4.
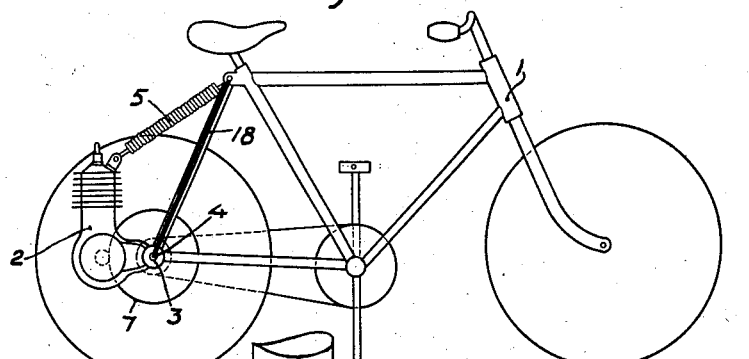
Fig.1.
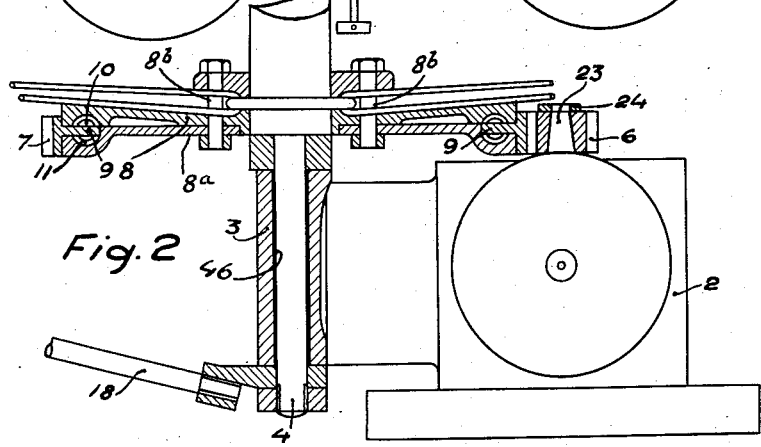
Fig.2.
Fig.3.
Carl Alrik Hult
INVENTOR
By
his Attorney Carl Alrik Hult
INVENTOR;

Jan. 1, 1935.  C. A. HULT  1,985,895
VELOCIPEDE
Filed Oct. 1, 1932  3 Sheets-Sheet 3

Carl Alrik Hult
INVENTOR;
By
His Attorney

Patented Jan. 1, 1935

1,985,895

UNITED STATES PATENT OFFICE 1,985,895

VELOCIPEDE

Carl Alrik Hult, Stockholm, Sweden

Application October 1, 1932, Serial No. 635,748
In Sweden July 4, 1931

7 Claims. (Cl. 180—33)

This invention relates to improvements in motorcycles and more particularly in bicycles to which a motor is attached, and the invention has for its object to effect resilient and smooth power transmission from the motor to the wheel of the bicycle preferably through a gearing mounted in a gear casing which permits the use of different gears as well as of free motion.

Due to the resilient mounting of the motor and to the resilient and smooth power transmission from the motor to the wheel of the cycle a considerable part of the vibrations from the motor is averted from the frame of the cycle. The present arrangement neutralizes the shocks from an uneven road surface by which the bicycle, the motor and the gear case are saved to a considerable extent. A further advantage is that change speed engagement is considerably facilitated.

According to this invention a motor driven cycle comprises a power unit mounted to oscillate about the axis of one of the wheels of the cycle, and resiliently constrained against rocking movement, and a resilient transmission system for transmitting power from the unit to the cycle wheel.

Preferably the transmission system is of the gear type and comprises one or more gears movable into mesh with a gear connected to the hub of one of the wheels of the cycle to effect connection and disconnection of the power drive. If more than one gear be provided the gears may be of different diameter so that a variation in the speed of the drive may be effected. Preferably also such gears are mounted in a casing adapted to rotate about the engine shaft, to bring the gears into and out of mesh with the gear on the hub of one of the cycle wheels.

The invention is illustrated by way of the accompanying drawings.

Figure 1 is a diagrammatical view of a bicycle arranged as a motor cycle;

Figure 2 is a substantially longitudinal sectional view taken on lines 2—2 of Figure 3;

Figure 3 is a detail view of the device;

Figure 4 is a substantially transverse sectional view of the resilient support for the motor casing;

Figure 5:
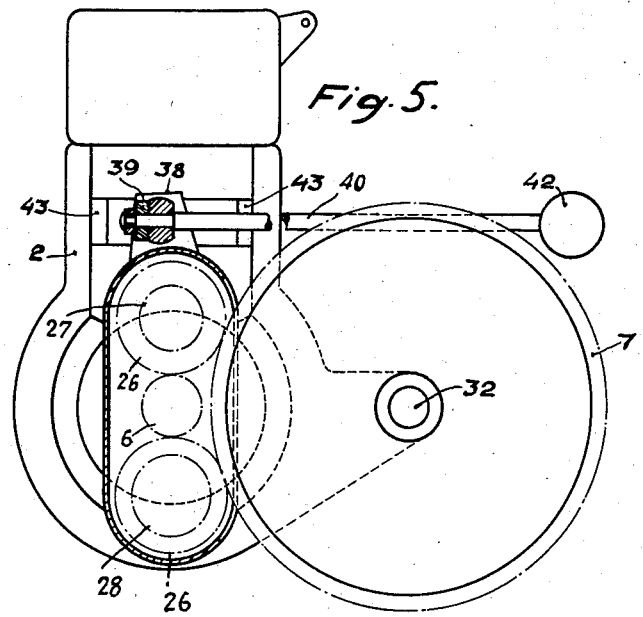
Figure 5 is a section of the gear-case taken at right angles to the crank-shaft with the gears in the neutral position.
Figure 6:
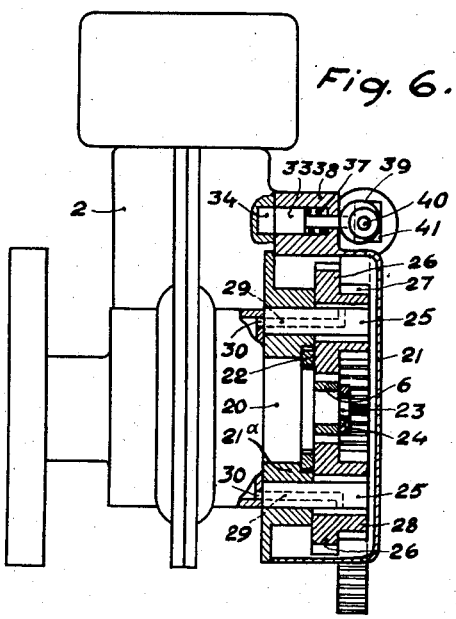
Figure 6 is a section taken parallel to the crank-shaft.
Figure 7:
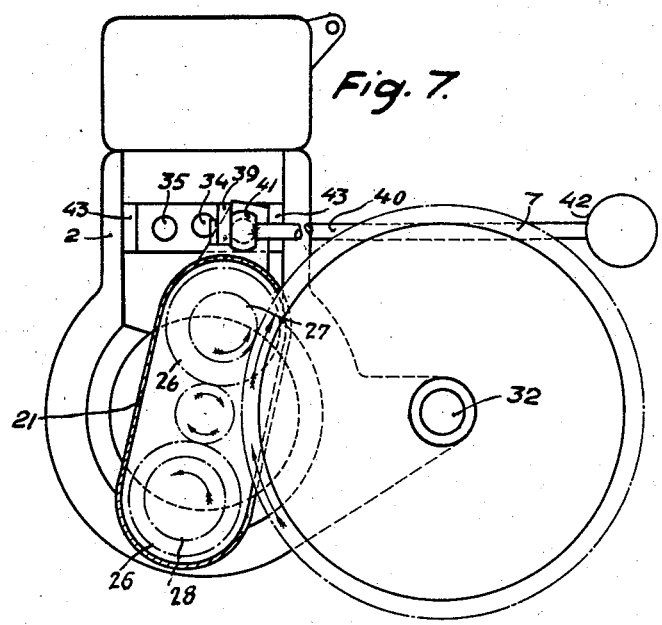
Figures 7 and 8 show schematically different adjustments of the gear-case with the gears in the low and high positions respectively.

A motor 2 is mounted on the cycle 1, the frame of the motor being supported on a sleeve 3 parallel to the crank shaft of the motor so that the frame may be oscillatably mounted on the axle 4 extending from the centre of the cycle wheel. The motor is thus able to oscillate about the axle, the movement being controlled in both directions by means of a spring for example a spiral spring 5 or rubber buffers, which, at one end, is directly or indirectly secured to the motor and at its other end to the frame of the cycle. The motor shaft 23 is provided with a pinion 6 fixed thereto by means of a nut 24 directly or indirectly engaging a toothed ring 7, resiliently connected to the bicycle wheel and journalled between a disc 8ª and a hub 8 centrally mounted on the cycle wheel, said disc 8ª being attached to the hub by means of bolts 8ᵇ.

The toothed ring 7 is provided with projections 9 extending inwardly and across a circular slot 10 in the hub, and the disc 8ª in which slot elastic means such as spiral springs 11 or rubber buffers are located. The slot is provided with stationary projections 12 serving as abutments for the spiral springs. The spiral spring 5 or the like controlling the oscillation of the motor may be controlled from the inside or from the outside so that no lateral bending occurs. Figure 4 shows such an outer control member, namely the sleeve 13, which is closed at either end by plugs or buffer supports 14 for limiting the stretch of the spring. Spring supports 15 are screwed into the spring, and have arms 16 extending therefrom, the said arms being secured one to the motor and one to the frame of the cycle. The spring 5 is preferably adapted for tension and compression. One of the spring supports 15 may preferably have its point of contact with the spring 5 at some distance from one end thereof so that the overlapping end of the spring may act as a shock-absorber against the buffer support 14. A stay 18 is secured to the axle 4 in order to support the same, the other end of the said stay being secured to the frame of the cycle. The motor may be of any desired type or construction. The resilient suspension of the motor makes it necessary to make the connections either of the pinion 6 or of the ring 7 with its hub resilient. The pinion 6 and the ring 7 may alternately be replaced by wheels provided with a chain drive. A toothed wheel may be used instead of the toothed ring, the said wheel being journalled on the shaft of the hub so that it obtains a certain resilient free motion relative to the shaft.

In the arrangement of the gear-case shown in Figures 5–8 a bearing hub 20 extends from the crank-case of the motor 2 on which hub the gear-casing 21 is pivotally journalled a nut 22 preventing the axial displacement of the frame 21ª. Two axles 25 are secured to the casing 21, pinions 26 being rotatably journalled on the said axles. The pinions 26 are in continuous engagement with the central pinion 6. Antifriction rollers may be provided between shafts and pinions. In order to provide a greater ratio the pinions 26 are formed with special pinions 27 and 28 respectively, one pinion being smaller in diameter than the other. The shafts are formed with oil passages 29 extending from the ends of the axles 25 towards the crank-case of the motor and opening into the passages in the bearings. A number of holes 30 are provided in the face of the crank-case resting against the frame 21ª of the gear-case, the said holes being located at the same radial distance from the centre of the hub 20 as the passages in the axles and placed laterally in such a manner that in each clutching position of the gear case, there are three (shown in Figs. 5, 7 and 8) of which one relates to the position of the gear case shown in Fig. 5, i. e., for free motion, two of the holes 29 face the two openings of the oil passages 30 in the shafts 25 to connect said passages with the interior of the crank case. The remaining apertures 30 are closed by the frame 21ª of the gear case 21.

The toothed ring 7 or a corresponding gear wheel is provided laterally of the pinions 27 and 28 and in the same plane with the same, which toothed ring or gear wheel may be mounted on a suitable shaft 32 or directly onto any of the cycle wheels. The oscillating gear-case 21 is locked in the clutching positions by means of a bolt 33, which is located in a sleeve 38 forming a part of the gear case 21. Said bolt is brought into or out of engagement with the holes 34, 35 and 36, provided in or on the body of the motor. The bolt is actuated axially by a spring 37 tending to press it outwards from the bolt sleeves 38, but it may also be actuated and moved in the opposite direction by the rotation of the eccentric disc 39, which is secured on a shaft 40, journalled and rotatable in the outwardly turned head 41 of the bolt. The shaft 40 is provided with a knob or handle 42. The oscillating motion of the gear-case around the hub 20 is limited by the motion of the sleeve 38 between projections 43. The projections and the sleeve are arranged in such a manner relative to each other that when the sleeve contacts with one or the other of the projections, the correct clutching position for pinion and gear wheel is obtained, as well as a correct locking position for the bolt and the gear-case. The free clutching position is located approximately midway between the projections 43.

The gear operates in the following manner: When the motor is running the motion of the crank-shaft is transmitted to the pinions 26, 27 and 28 by means of the central pinion 6; if the bolt 33 is between the locking holes 35, 36 the pinions are able to rotate freely relative to the toothed ring or the toothed wheel 7. When it is required to clutch and transmit drive i. e. when the speed is to be changed, the bolt is released from its locking position in the hole 34, by rotating the shaft 40, and thus the eccentric sheave 39 through half a revolution by means of the knob 42. By pulling the knob and thus the shaft 40 forwards or backwards the gear-case may be turned to a position, which is suitable for the clutching position desired, so that either the small pinion 27 or the big pinion 28 is brought into engagement with the ring 7. When the said position has been reached the bolt is in locking position in either of the locking holes 35 or 36 and if the shaft 40 is again rotated through half a revolution, the bolt enters the holes under the influence of the spring 39 and locks the gear-case.

It will be understood that the bolt 33 only fixes the gear case in relation to the motor, i. e., the function of the spring 5, or the resilient connection between motor and cycle takes place independently of the said locking of the gear case.

It may be easily understood that the engagement between pinion and cog ring is facilitated by the resilience of the cog ring in a peripheral direction shown in Figure 3.

The motion of the bolt, which, in the example shown, is actuated in one direction by a spring and in the other direction by an eccentric, cam or the like, may of course have a guided movement in both directions. The shaft 40 may be of any desired length so as to be located in the most suitable handling position on the cycle.

The passages of the bearings of the axles 25 are greased automatically from the crank-case when the motor is running. During the crank-case compression, a very small quantity of gas mixed with oil is forced through two of the holes 30 and into the oil passages 29 of the bearings.

The pinions 26 may be of a different size in order to permit of different ratios by direct engagement with the cog ring 7, but in order to get the speed of the motor reduced to the lower speed without using big cog wheels, it is advantageous to combine the pinions 26 with the pinions 27 and 28, the latter being of different diameters. Instead of the cog ring 7 and the pinions 27 and 28 a sprocket ring and sprocket pinions may be provided so that a chain drive of the cycle may be applied.

The pinions 26, 27 and 28 may, of course also be provided with shafts journalled in ball bearings or in plain bearings.

Figure 8:
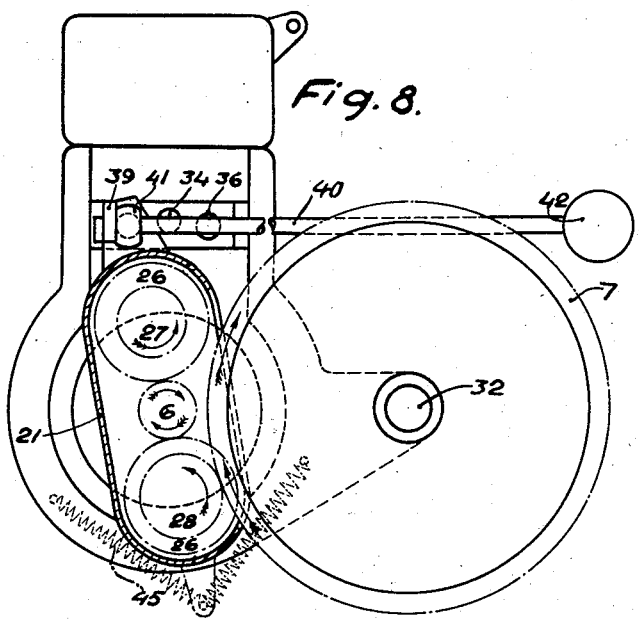

The casing 21 may be arranged in such a manner that, by means of actuating springs 45, shown in Figure 8, it is brought back automatically to its declutching position, when the bolt 33 is released from any of the holes 35, 36 in which case the hole 34 is omitted.

To avert the side vibrations from the motor to be transmitted to the bicycle and the fixed shaft 4, a rubber bushing 46 or the like is inserted between the shaft and the sleeve 3.

Having now described my invention, what I claim as new and desire to secure by Letters Patent is:

1. In combination with a bicycle comprising a frame, wheel axles carried by said frame and wheels for said axles, of a casing, a motor enclosed therein, said casing being pivoted to the axle of the rear wheel and resiliently supported on the frame, a second casing oscillatably mounted on said first casing, a transmission gear set enclosed in said second casing and adapted to engage and disengage the wheel, and means to oscillate the second casing to bring alternate gears of the set into engagement with the wheel to effect a change in the driving speed.

2. A bicycle, as claimed in claim 1, including a driving shaft for the motor, the second casing being rotatable about said shaft, said gear set comprising a gear disposed on the said driving shaft, a pair of spindles disposed in said second casing, and gears on said spindles in mesh with the gear on the shaft.

3. A bicycle, as claimed in claim 1, including a driving shaft for the motor, the second casing being rotatable about said shaft, said gear set comprising a gear disposed on the latter, a pair of spindles disposed in said second casing, and gears on said spindles in mesh with the gear on the shaft, said gears on the spindles each carrying a transmission gear of different diameter, a gear disposed on the rear wheel of the bicycle to alternately engage the gears on said spindles to change the speed of the wheel.

4. A bicycle as claimed in claim 1, in which said first casing is provided with a plurality of recesses, the said means for moving the second casing being provided with a bolt adapted to engage the said recesses in the first casing to lock the second casing thereto, whereby a gear of said set is locked in its engaged position with the wheel.

5. A bicycle, as claimed in claim 1, in which said first casing is provided with recesses, and in which the said second casing comprises a projection having a recess therein, a bolt in said latter recess adapted to engage the said recesses in the first casing, resilient means urging said bolt out of the said recess in the projection, a cam associated with said bolt to control the same, and a control rod to actuate said cam and move the second casing for setting the engagement of a transmission gear with the wheel.

6. A bicycle as claimed in claim 1, in which said first casing is provided with recesses, and in which the said second casing comprises a projection having a recess therein, a bolt in said recess adapted to engage the said recesses in the first casing, resilient means urging said bolt out of the said recesses in the projection, a cam associated with said bolt to control the same, a control rod to actuate said cam and move the second casing, and resilient means for automatically moving the said second casing to disengage the transmission gears from the wheel on disengagement of the bolt.

7. In a motor driven cycle, a motor and an oscillatable mounting therefor, a resilient support for the motor to protect it against the oscillating movement, the axis of said movement being coaxial with one of the cycle wheels and the shaft of the motor being eccentric with respect to said axis and in a position permitting the motor to oscillate up and down, a cog wheel transmission connecting the shaft of the motor with said cycle wheel, and a resilient connection between the cog wheel transmission and the cycle wheel maintaining the cog wheels of the transmission in mesh during the oscillating movement of the motor.

CARL ALRIK HULT.